(12) United States Patent
Yang et al.

(10) Patent No.: US 10,333,325 B2
(45) Date of Patent: Jun. 25, 2019

(54) CHARGING STATE INDICATING CIRCUIT

(71) Applicant: Shenzhen China Star Optoelectronics Semiconductor Display Technology Co., Ltd., Shenzhen (CN)

(72) Inventors: Yong Yang, Shenzhen (CN); Fangyun Liu, Shenzhen (CN)

(73) Assignee: SHENZHEN CHINA STAR OPTOELECTRONICS SEMICONDUCTOR DISPLAY TECHNOLOGY CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/743,657

(22) PCT Filed: Dec. 6, 2017

(86) PCT No.: PCT/CN2017/114868
§ 371 (c)(1),
(2) Date: Jan. 10, 2018

(87) PCT Pub. No.: WO2019/015225
PCT Pub. Date: Jan. 24, 2019

(65) Prior Publication Data
US 2019/0027948 A1    Jan. 24, 2019

(30) Foreign Application Priority Data
Jul. 18, 2017    (CN) .......................... 2017 1 0586763

(51) Int. Cl.
*H02J 7/00* (2006.01)
*H05B 33/08* (2006.01)

(52) U.S. Cl.
CPC ........ *H02J 7/0047* (2013.01); *H05B 33/0806* (2013.01); *H05B 33/0845* (2013.01); *H05B 33/0815* (2013.01)

(58) Field of Classification Search
CPC ...... H02J 7/0029; H02J 7/0045; H02J 7/0055; H02J 7/0073
(Continued)

(56) References Cited

U.S. PATENT DOCUMENTS 4,266,178 A * 5/1981 Asakawa ................ G04C 10/02
136/293
5,481,177 A * 1/1996 Hamley ................ H01M 10/46
320/111
(Continued)

FOREIGN PATENT DOCUMENTS

CN 201504113 U 6/2010
CN 203674759 U 6/2014
(Continued)

*Primary Examiner* — Tung X Le
(74) *Attorney, Agent, or Firm* — Leong C. Lei

(57) ABSTRACT

Disclosed is a charging state indicating circuit, including a indicating circuit, having: a first operational amplifier, having a non-inverting input end inputted with a first sampled voltage and an inverting input end inputted with a first reference voltage; a first triode, having a base coupled to an output end of the first operational amplifier through a first resistor, an emitter coupled to a second reference voltage through a second resistor and a collector coupled to an anode of a first light emitting diode; a second triode, having a base coupled to the output end of the first operational amplifier through a third resistor, an emitter coupled to an anode of a second light emitting diode and a collector coupled to the second reference voltage; a cathode of the first light emitting diode and a cathode of the second light emitting diode are grounded and light colors are different.

14 Claims, 1 Drawing Sheet

(58) Field of Classification Search
USPC .................................. 320/119, 124, 138, 161
See application file for complete search history.

(56) References Cited

U.S. PATENT DOCUMENTS

2008/0278119 A1* 11/2008 Veselic ................. H02J 7/0022
　　　　　　　　　　　　　　　　　　　　　　　　320/161
2018/0191170 A1* 7/2018 Huang ................... H02J 7/007

FOREIGN PATENT DOCUMENTS

CN　　107332308 A　　11/2017
KR　　100233163 B1　　12/1999

* cited by examiner

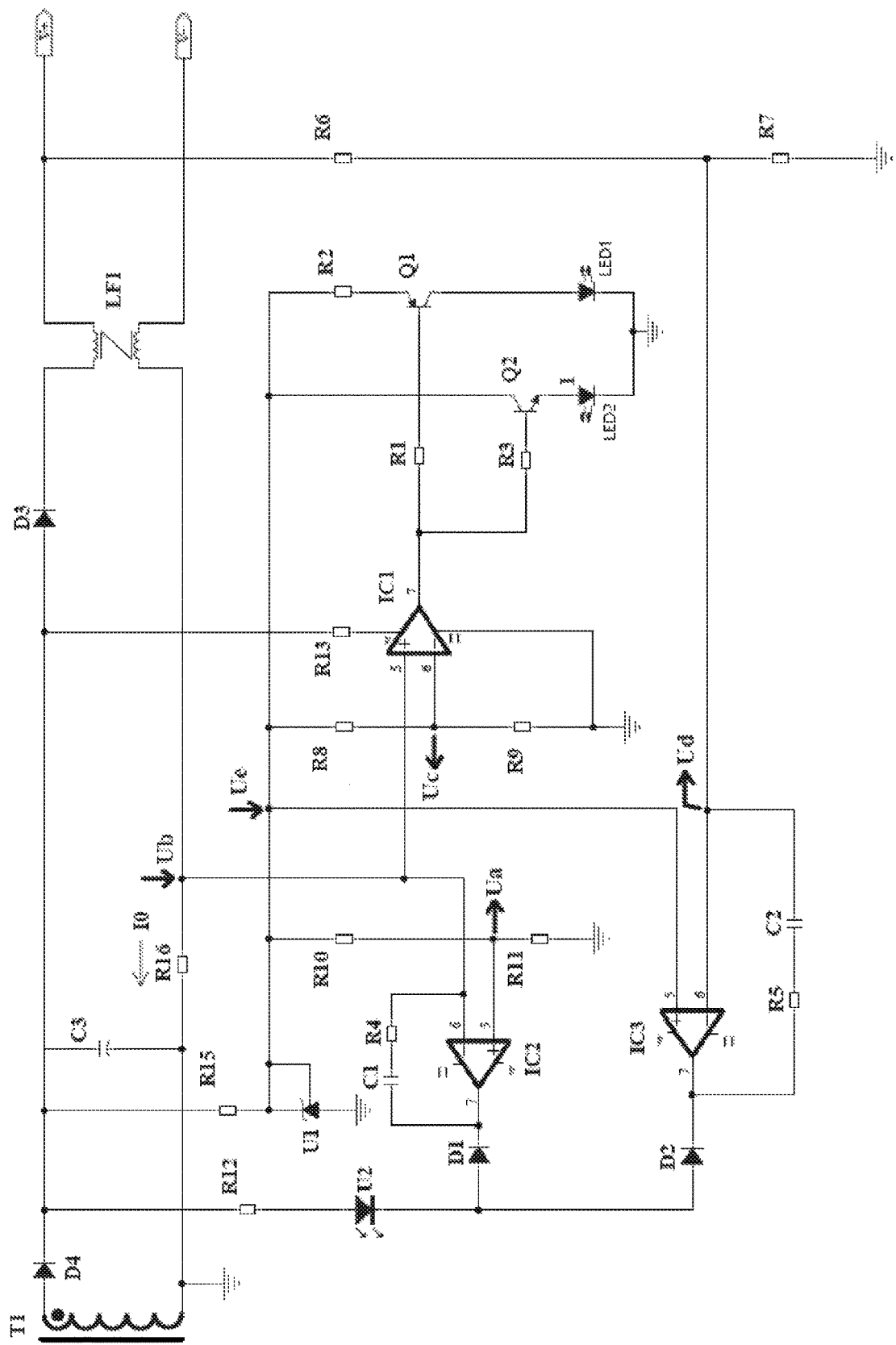

CHARGING STATE INDICATING CIRCUIT

FIELD OF THE INVENTION

The present invention relates to a charging field, and more particularly to charging state indicating circuit.

BACKGROUND OF THE INVENTION

Lead-acid batteries are mainly used in electric vehicles, in order to charge the lead-acid batteries reasonably, fast and efficiently, the lead-acid battery charger often uses a "three-stage" charge, that is, the constant current charging stage, the constant voltage charging stage and the tiny current charging (trickle charging) stage: the constant current charging is implemented in the first stage; when the voltage reaches the predetermined value, the constant voltage charging is implemented in the second stage and the current gradually decreases; then, the tin current charging is implemented in the third stage, the battery remains in a nearly fully charging state to continue the tiny current charging. For observing the charging state of the battery better, it is necessary to design a charging state indicating circuit for indicating the charging state of the battery.

SUMMARY OF THE INVENTION

An objective of the present invention is to provide a charging state indicating circuit to indicate a charging state of a battery by an indicating circuit.

For realizing the aforesaid objective, the present invention provides a charging state indicating circuit, comprising a state indicating circuit, wherein the state indicating circuit comprises:

a first operational amplifier, having a non-inverting input end inputted with a first sampled voltage and an inverting input end inputted with a first reference voltage; the non-inverting input end of the first operational amplifier is coupled to a negative terminal of a battery to sample a voltage level of a negative terminal of the charging state indicating circuit to obtain the first sampled voltage;

a first triode, having a base coupled to an output end of the first operational amplifier through a first resistor, an emitter coupled to a second reference voltage through a second resistor and a collector coupled to an anode of a first light emitting diode;

a second triode, having a base coupled to the output end of the first operational amplifier through a third resistor, an emitter coupled to an anode of a second light emitting diode and a collector coupled to the second reference voltage;

a cathode of the first light emitting diode and a cathode of the second light emitting diode are grounded, a light color of the first light emitting diode and a light color of the second light emitting diode are different.

The light color of the first light emitting diode is green and the light color of the second light emitting diode is red.

The charging state indicating circuit further comprises a current loop circuit, wherein the current loop circuit comprises:

a second operational amplifier, having a non-inverting input end inputted with a third reference voltage and an inverting input end coupled to an output end of the second operational amplifier through a fourth resistor and a first capacitor; the inverting input end is further inputted with the first sampled voltage, an output end of the second operational amplifier is coupled to a cathode of a first diode and an anode of the first diode is inputted with a high voltage level.

The charging state indicating circuit further comprises a voltage loop circuit, wherein the voltage loop circuit comprises:

a third operational amplifier, having a non-inverting input end inputted with the second reference voltage and an inverting input end coupled to an output end of the third operational amplifier through a fifth resistor and a second capacitor; the inverting input end is further inputted with a second sampled voltage, an output end of the third operational amplifier is coupled to a cathode of a second diode and an anode of the second diode is inputted with the high voltage level.

The second sampled voltage is obtained by sampling a voltage level of a positive terminal of the charging state indicating circuit; the positive terminal is grounded through a sixth resistor and a seventh resistor and the second sampled voltage is obtained from a connecting point of the sixth resistor and the seventh resistor.

The inverting input end of the first operational amplifier is further coupled to one end of an eighth resistor and one end of a ninth resistor, the other end of the eighth resistor is coupled to the second reference voltage and the other end of the ninth resistor is grounded.

The non-inverting input end of the second operational amplifier is further coupled to one end of a tenth resistor and one end of an eleventh resistor, the other end of the tenth resistor is coupled to the second reference voltage and the other end of the eleventh resistor is grounded.

A constant charging voltage of the charging state indicating circuit is set by setting a resistance value of the sixth resistor and a resistance value of the seventh resistor.

An indicating current of the charging state indicating circuit is set by setting a resistance value of the eighth resistor and a resistance value of the ninth resistor.

The present invention further provides a charging state indicating circuit, comprising a state indicating circuit, wherein the state indicating circuit comprises:

a first operational amplifier, having a non-inverting input end inputted with a first sampled voltage and an inverting input end inputted with a first reference voltage; the non-inverting input end of the first operational amplifier is coupled to a negative terminal of a battery to sample a voltage level of a negative terminal of the charging state indicating circuit to obtain the first sampled voltage;

a first triode, having a base coupled to an output end of the first operational amplifier through a first resistor, an emitter coupled to a second reference voltage through a second resistor and a collector coupled to an anode of a first light emitting diode;

a second triode, having a base coupled to the output end of the first operational amplifier through a third resistor, an emitter coupled to an anode of a second light emitting diode and a collector coupled to the second reference voltage;

a cathode of the first light emitting diode and a cathode of the second light emitting diode are grounded, a light color of the first light emitting diode and a light color of the second light emitting diode are different;

wherein the light color of the first light emitting diode is green and the light color of the second light emitting diode is red;

the charging state indicating circuit further comprises a current loop circuit, wherein the current loop circuit comprises:

a second operational amplifier, having a non-inverting input end inputted with a third reference voltage and an inverting input end coupled to an output end of the second operational amplifier through a fourth resistor and a first capacitor; the inverting input end is further inputted with the first sampled voltage, an output end of the second operational amplifier is coupled to a cathode of a first diode and an anode of the first diode is inputted with a high voltage level;

The charging state indicating circuit further comprises a voltage loop circuit, wherein the voltage loop circuit comprises:

a third operational amplifier, having a non-inverting input end inputted with the second reference voltage and an inverting input end coupled to an output end of the third operational amplifier through a second capacitor and a fifth resistor; the inverting input end is further inputted with a second sampled voltage, an output end of the third operational amplifier is coupled to a cathode of a second diode and an anode of the second diode is inputted with the high voltage level;

The second sampled voltage is obtained by sampling a voltage level of a positive terminal of the charging state indicating circuit; the positive terminal is grounded through a sixth resistor and a seventh resistor and the second sampled voltage is obtained from a connecting point of the sixth resistor and the seventh resistor.

In conclusion, the charging state of the battery can be conveniently observed in the charging state indicating circuit of the present invention to indicate charging state of the battery with LED lamps having various colors. It is simple and practical.

BRIEF DESCRIPTION OF THE DRAWINGS

The technical solution and the beneficial effects of the present invention are best understood from the following detailed description with reference to the accompanying FIGURE and embodiments.

In drawings,

FIG. 1 is a circuit diagram of one preferred embodiment of a charging state indicating circuit according to the present invention.

DETAILED DESCRIPTION OF PREFERRED EMBODIMENTS

Please refer to FIG. 1, which is a circuit diagram of one preferred embodiment of a charging state indicating circuit according to the present invention. For observing the charging state of the battery better, the present invention adds an indicating circuit in a lead-acid battery charging circuit. The specifications of the respective components and the key current, the key voltages in the charging circuit can be referred to labels in FIG. 1. The external power supply is inputted to the charging state indicating circuit through the transformer T1. The lead-acid battery accepts the charging by being connected with the positive terminal V+ and the negative terminal V−. A common mode inductance LF1 is connected before the positive terminal V+ and the negative terminal V− for filtering.

The indicating circuit of the charging state indicating circuit according to the present invention mainly comprises: a first operational amplifier IC1, having a non-inverting input end inputted with a first sampled voltage Ub and an inverting input end inputted with a first reference voltage Uc; a PNP type first triode Q1, having a base coupled to an output end of the first operational amplifier IC1 through a first resistor R1, an emitter coupled to a second reference voltage Ue through a second resistor R2 and a collector coupled to an anode of a first light emitting diode LED1 (green); a NPN type second triode Q2, having a base coupled to the output end of the first operational amplifier IC1 through a third resistor R3, an emitter coupled to an anode of a second light emitting diode LED2 (red) and a collector coupled to the second reference voltage Ue; a cathode of the first light emitting diode LED1 and a cathode of the second light emitting diode LED2 are grounded. In this embodiment, the pins 4 and 11 of the first operational amplifier IC1 are further inputted with a high voltage level and a low voltage level, respectively to be a protecting circuit. One pin is coupled to the high voltage level the external power supply after being processed by a transformer T1 and the other pin is grounded. The first sampled voltage Ub is obtained by sampling the voltage level of the negative terminal V−.

A second operational amplifier IC2, a first capacitor C1, a fourth resistor R4 and a first diode D1 form a current loop circuit, mainly comprising: a second operational amplifier IC2, having a non-inverting input end inputted with a third reference voltage Ua and an inverting input end coupled to an output end through a fourth resistor R4 and a first capacitor C1; the inverting input end is further inputted with the first sampled voltage Ub, an output end is coupled to a cathode of a first diode D1 and an anode of the first diode D1 is inputted with a high voltage level. In this preferred embodiment, the first sampled voltage Ub is obtained by sampling the voltage level of the negative terminal V−.

A third operational amplifier IC3, a fifth resistor R5, a second capacitor R2 and a second diode D2 form a voltage loop circuit, mainly comprising a third operational amplifier IC3, having a non-inverting input end inputted with the second reference voltage Ue and an inverting input end coupled to an output end through a fifth resistor R5 and a second capacitor C2; the inverting input end is further inputted with a second sampled voltage Ud, an output end is coupled to a cathode of a second diode D2 and an anode of the second diode D2 is inputted with the high voltage level. In this preferred embodiment, the second sampled voltage Ud is obtained by sampling the voltage level of the positive terminal V+. The positive terminal V+ is grounded through a sixth resistor R6 and a seventh resistor R7 and the second sampled voltage Ud is obtained from a connecting point of the sixth resistor R6 and the seventh resistor R7; the cathode of the second diode D2 is coupled to the high voltage level of the external power supply after being processed by the transformer T1 through a light emitting diode U2.

Two ends of an eighth resistor R8 are respectively coupled to the second reference voltage Ue and the first reference voltage Uc. Two ends of a ninth resistor R9 are respectively coupled to the first reference voltage Uc and grounded. Two ends of a tenth resistor R10 are respectively coupled to the second reference voltage Ue and the third reference voltage Ua. Two ends of an eleventh resistor R11 are respectively coupled to the third reference voltage Ua and grounded.

The working principle of the charging state indicating circuit of the present invention is described as follows. The lead-acid battery generally utilizes "three-stage" charging, i.e. the constant current charging stage, the constant voltage charging stage and the tiny current charging (constant voltage charging) stage:

1. the constant current charging stage: when the voltage of the loading end is lower, the power supply uses a larger current I0 to charge the battery and then, the first sampled voltage Ub at the inverting input end of the second operational amplifier IC2 is larger than the third reference voltage Ua, the second operational amplifier IC2 outputs the low voltage level, the first diode D1 is activated. Since the current loop (the voltage loop is the same in the following) works in an closed loop system, the power supply implements the constant current charging to the battery by taking the second operational amplifier IC2 as the feedback start.

Then, the first sampled voltage Ub is larger than the first reference voltage Uc, the first operational amplifier IC1 outputs the high voltage level, the second triode Q2 is activated and the first triode Q1 is deactivated. Then, the second light emitting diode LED2 lights red, the power supply enters the constant current charging stage.

2. the constant voltage charging stage: with the constant current charging continues, the battery voltage gradually increases. When the output voltage of the power supply is larger than V0, the second sampled voltage Ud is larger than the second reference voltage Ue, the third operational amplifier IC3 outputs the low voltage level, the second diode D2 is activated. The power supply implements the constant voltage charging to the battery by taking the third operational amplifier IC3 as the feedback start.

3. the tiny current charging stage: after charging for a period of time, the voltage drop between the power supply and the battery gradually decreases, the charging current of the battery also starts to decrease. The first sampled voltage Ub decreases and the current loop stops working.

When the charging current is smaller than the indicating current I1, the first reference voltage Uc is larger than the first sampled voltage Ub. The first operational amplifier IC1 outputs the low voltage level, the second triode Q2 is deactivated, the first triode Q1 is activated. The first light emitting diode LED1 lights green, the power supply implements the tiny current charging with V0 until the fully charge is accomplished. In this preferred embodiment, the constant charging current I0 can be set by setting a resistance value of the tenth resistor R10 and a resistance value of the eleventh resistor R11; the indicating current I1 is set by setting the eighth resistor R8 and the ninth resistor R9; the constant charging voltage V0 can be set by setting the seventh resistor R7 and the sixth resistor R6.

The present invention provides the charging state of the battery to indicate charging state of the battery with LED lamps having various colors in real time. It is simple and practical and can also be applied in other circuits.

The following specific embodiment is illustrated to explain the working principle of the present circuit.

As shown in FIGURE in this preferred embodiment, the tenth resistor R10=100K, the eleventh resistor R11=1.63K; the eighth resistor R8=100K, the ninth resistor R9=245Ω; the sixth resistor R6=86K, the seventh resistor R7=10K. By calculation, the third reference voltage Ua=0.04V, the first reference voltage Uc=0.006V, the second reference voltage Ue=2.5V, the constant charging current I0=2 A, the indicating current I1=300 mA, the constant charging voltage V0=24V.

1. the constant current charging stage: in the beginning of charging, the voltage of the battery is lower and the power supply provides a larger current to the battery. When the charging current is larger than or equal to 2 A, the first sampled voltage Ub is larger than or equal to 0.04V, the second operational amplifier IC2 outputs the low voltage level, the first diode D1 is activated. Under the function of current loop, the power supply implements the constant current charging to the battery by taking the second operational amplifier IC2 as the negative feedback. The charging current I0=2 A and the first sampled voltage Ub=0.04V. Since the first reference voltage Uc=0.006V, the first sampled voltage Ub is larger than the first reference voltage Uc, the first operational amplifier IC1 outputs the high voltage level, the second triode Q2 is activated. Then, the second light emitting diode LED2 lights red, the power supply enters the constant current charging stage.

2. the constant voltage charging stage: with the charging continues, the battery voltage gradually increases. When the battery voltage is larger than or equal to 24V, the second sampled voltage Ud is larger than or equal to 2.5V, i.e. the second sampled voltage Ud is larger than or equal to the second reference voltage Ue. The third operational amplifier IC3 outputs the low voltage level, the second diode D2 is activated. The power supply starts to enter the constant voltage charging stage and the constant charging voltage V0=24V. Since the charging current decreases (smaller than 2 A), the first sampled voltage Ub is smaller than 0.04V, i.e. the first sampled voltage Ub is smaller than the third reference voltage Ua. The second operational amplifier IC2 outputs the high voltage level, the first diode D1 is deactivated and the constant current loop stops working.

3. the tiny current charging stage: in the constant voltage charging process, the charging current constantly decreases. When the charging current is smaller than the indicating current I1=300 mA, the first sampled voltage Ub is smaller than 0.006V, i.e. the first sampled voltage Ub is smaller than the first reference voltage Uc. The first operational amplifier IC1 outputs the low voltage level, the first triode Q1 is activated. The first light emitting diode LED1 lights green, the power supply implements the tiny current charging with V0=24V. The charging current keeps decreasing and does not stop charging until the battery voltage and the charger voltage are basically the same.

The present invention detects the charging state of the battery in real time and indicates the charging state with the indicating circuit. With this circuit, the intelligent design of the lead-acid battery charger can be realized to achieve the intelligent design of the charger, which is simple and practical and the cost thereof is low.

In conclusion, the charging state of the battery can be conveniently observed in the charging state indicating circuit of the present invention to indicate charging state of the battery with LED lamps having various colors. It is simple and practical.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A charging state indicating circuit, comprising a state indicating circuit, wherein the state indicating circuit comprises:
  a first operational amplifier, having a non-inverting input end inputted with a first sampled voltage and an inverting input end inputted with a first reference voltage; the non-inverting input end of the first operational amplifier is coupled to a negative terminal of a battery to sample a voltage level of a negative terminal of the charging state indicating circuit to obtain the first sampled voltage;
  a first triode, having a base coupled to an output end of the first operational amplifier through a first resistor, an emitter coupled to a second reference voltage through a second resistor and a collector coupled to an anode of a first light emitting diode;

a second triode, having a base coupled to the output end of the first operational amplifier through a third resistor, an emitter coupled to an anode of a second light emitting diode and a collector coupled to the second reference voltage;

a cathode of the first light emitting diode and a cathode of the second light emitting diode are grounded, a light color of the first light emitting diode and a light color of the second light emitting diode are different.

2. The charging state indicating circuit according to claim 1, wherein the light color of the first light emitting diode is green and the light color of the second light emitting diode is red.

3. The charging state indicating circuit according to claim 1, further comprising a current loop circuit, wherein the current loop circuit comprises:

a second operational amplifier, having a non-inverting input end inputted with a third reference voltage and an inverting input end coupled to an output end of the second operational amplifier through a fourth resistor and a first capacitor; the inverting input end is further inputted with the first sampled voltage, an output end of the second operational amplifier is coupled to a cathode of a first diode and an anode of the first diode is inputted with a high voltage level.

4. The charging state indicating circuit according to claim 3, further comprising a voltage loop circuit, wherein the voltage loop circuit comprises:

a third operational amplifier, having a non-inverting input end inputted with the second reference voltage and an inverting input end coupled to an output end of the third operational amplifier through a fifth resistor and a second capacitor; the inverting input end is further inputted with a second sampled voltage, an output end of the third operational amplifier is coupled to a cathode of a second diode and an anode of the second diode is inputted with the high voltage level.

5. The charging state indicating circuit according to claim 4, wherein the second sampled voltage is obtained by sampling a voltage level of a positive terminal of the charging state indicating circuit; the positive terminal is grounded through a sixth resistor and a seventh resistor and the second sampled voltage is obtained from a connecting point of the sixth resistor and the seventh resistor.

6. The charging state indicating circuit according to claim 5, wherein a constant charging voltage of the charging state indicating circuit is set by setting a resistance value of the sixth resistor and a resistance value of the seventh resistor.

7. The charging state indicating circuit according to claim 3, wherein the non-inverting input end of the second operational amplifier is further coupled to one end of a tenth resistor and one end of an eleventh resistor, the other end of the tenth resistor is coupled to the second reference voltage and the other end of the eleventh resistor is grounded.

8. The charging state indicating circuit according to claim 1, wherein the inverting input end of the first operational amplifier is further coupled to one end of an eighth resistor and one end of a ninth resistor, the other end of the eighth resistor is coupled to the second reference voltage and the other end of the ninth resistor is grounded.

9. The charging state indicating circuit according to claim 8, wherein an indicating current of the charging state indicating circuit is set by setting a resistance value of the eighth resistor and a resistance value of the ninth resistor.

10. A charging state indicating circuit, comprising a state indicating circuit, wherein the state indicating circuit comprises:

a first operational amplifier, having a non-inverting input end inputted with a first sampled voltage and an inverting input end inputted with a first reference voltage; the non-inverting input end of the first operational amplifier is coupled to a negative terminal of a battery to sample a voltage level of a negative terminal of the charging state indicating circuit to obtain the first sampled voltage;

a first triode, having a base coupled to an output end of the first operational amplifier through a first resistor, an emitter coupled to a second reference voltage through a second resistor and a collector coupled to an anode of a first light emitting diode;

a second triode, having a base coupled to the output end of the first operational amplifier through a third resistor, an emitter coupled to an anode of a second light emitting diode and a collector coupled to the second reference voltage;

a cathode of the first light emitting diode and a cathode of the second light emitting diode are grounded, a light color of the first light emitting diode and a light color of the second light emitting diode are different;

wherein the light color of the first light emitting diode is green and the light color of the second light emitting diode is red;

a current loop circuit, wherein the current loop circuit comprises:

a second operational amplifier, having a non-inverting input end inputted with a third reference voltage and an inverting input end coupled to an output end of the second operational amplifier through a fourth resistor and a first capacitor; the inverting input end is further inputted with the first sampled voltage, an output end of the second operational amplifier is coupled to a cathode of a first diode and an anode of the first diode is inputted with a high voltage level;

a voltage loop circuit, wherein the voltage loop circuit comprises:

a third operational amplifier, having a non-inverting input end inputted with the second reference voltage and an inverting input end coupled to an output end of the third operational amplifier through a second capacitor and a fifth resistor; the inverting input end is further inputted with a second sampled voltage, an output end of the third operational amplifier is coupled to a cathode of a second diode and an anode of the second diode is inputted with the high voltage level;

wherein the second sampled voltage is obtained by sampling a voltage level of a positive terminal of the charging state indicating circuit; the positive terminal is grounded through a sixth resistor and a seventh resistor and the second sampled voltage is obtained from a connecting point of the sixth resistor and the seventh resistor.

11. The charging state indicating circuit according to claim 10, wherein the inverting input end of the first operational amplifier is further coupled to one end of an eighth resistor and one end of a ninth resistor, the other end of the eighth resistor is coupled to the second reference voltage and the other end of the ninth resistor is grounded.

12. The charging state indicating circuit according to claim 11, wherein an indicating current of the charging state indicating circuit is set by setting a resistance value of the eighth resistor and a resistance value of the ninth resistor.

13. The charging state indicating circuit according to claim 10, wherein the non-inverting input end of the second operational amplifier is further coupled to one end of a tenth resistor and one end of an eleventh resistor, the other end of the tenth resistor is coupled to the second reference voltage and the other end of the eleventh resistor is grounded.

14. The charging state indicating circuit according to claim 10, wherein a constant charging voltage of the charging state indicating circuit is set by setting a resistance value of the sixth resistor and a resistance value of the seventh resistor.

\* \* \* \* \*